United States Patent [19]
Gerba et al.

[11] Patent Number: 5,931,908
[45] Date of Patent: *Aug. 3, 1999

[54] VISUAL OBJECT PRESENT WITHIN LIVE PROGRAMMING AS AN ACTIONABLE EVENT FOR USER SELECTION OF ALTERNATE PROGRAMMING WHEREIN THE ACTIONABLE EVENT IS SELECTED BY HUMAN OPERATOR AT A HEAD END FOR DISTRIBUTED DATA AND PROGRAMMING

[75] Inventors: George Gerba, Venice; Robert E. Lambert, Glendale; Howard Meiseles, Santa Clarita; Mike Nichols, Altadena, all of Calif.

[73] Assignee: The Walt Disney Corporation, Burbank, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,263

[22] Filed: Dec. 23, 1996

[51] Int. Cl.$^6$ ..................................................... G06F 17/30
[52] U.S. Cl. .................. 709/219; 709/201; 709/202; 709/203; 709/204; 709/206; 709/218; 709/217; 707/104; 707/10; 348/13; 348/12; 348/7; 348/8; 348/10; 455/5.1; 455/4.1; 455/4.2; 455/6.2; 455/6.3
[58] Field of Search ..................... 395/200.49, 200.79, 395/200.3, 200.48, 200.82, 200.31, 200.34, 200.47; 348/7, 8, 9, 10, 13, 12; 455/4.1, 4.2, 6.2, 6.3, 5.1; 707/104

[56] References Cited

U.S. PATENT DOCUMENTS 4,381,522   4/1983   Lambert .
4,694,490   9/1987   Harvey et al. .

(List continued on next page.)

FOREIGN PATENT DOCUMENTS 0 711 076 A2   5/1996   European Pat. Off. .
0 746 153 A1   12/1996  European Pat. Off. .

(List continued on next page.)

OTHER PUBLICATIONS

Klappert, Walter R. and Sequeira, William J., US patent application Serial No. 08/774,055 filed Dec. 23, 1996 entitled Method and System for Providing Interactive Look–And–Feel In a Digital Broadcast Via X–Y Protocol.
*Technical alliances spark drive for interactive TV,* by David J. Bak, Design News, Sep. 25, 1995, pp. 25–26.

(List continued on next page.)

*Primary Examiner*—Frank J. Asta
*Assistant Examiner*—William D. Thomson
*Attorney, Agent, or Firm*—Irell & Manella LLP

[57] ABSTRACT

The present invention provides a method and apparatus for linking real-time data with audiovisual content to enable a user to make selections, manipulate data, and to execute functions interactively through an audiovisual display unit based upon audiovisual content being displayed at the time. Audiovisual content is synchronized with the available interactive functions so that the user has the ability to interact with and perform functions related to the audiovisual content being shown at the time. In a preferred embodiment, actionable events in audiovisual programs are synchronized with associated overlay functions and interface data. A method is provided to make overlay functions available to the user through an audiovisual display during the actionable events that occur in a program being viewed by the user. A user interface for each overlay function that may be performed, which user interface may or may not be visible to the user, is overlaid on and synchronized with the program being shown. Interaction with selections may be made using any of several known methods such as a screen menu or a cursor controlled by a remote control device.

9 Claims, 5 Drawing Sheets

U.S. PATENT DOCUMENTS

| | | |
|---|---|---|
| 4,706,121 | 11/1987 | Young . |
| 4,974,178 | 11/1990 | Izeki et al. . |
| 5,038,211 | 8/1991 | Hallenbeck . |
| 5,168,353 | 12/1992 | Walker et al. . |
| 5,196,838 | 3/1993 | Meier et al. . |
| 5,212,553 | 5/1993 | Maruoka . |
| 5,220,657 | 6/1993 | Bly et al. . |
| 5,223,924 | 6/1993 | Strubbe . |
| 5,251,324 | 10/1993 | McMullan, Jr. . |
| 5,262,865 | 11/1993 | Herz . |
| 5,317,306 | 5/1994 | Abraham et al. . |
| 5,323,240 | 6/1994 | Amano et al. . |
| 5,341,293 | 8/1994 | Vertelney et al. . |
| 5,351,075 | 9/1994 | Herz et al. . |
| 5,353,121 | 10/1994 | Young et al. . |
| 5,355,450 | 10/1994 | Garmon et al. . |
| 5,371,846 | 12/1994 | Bates . |
| 5,373,315 | 12/1994 | Dufresne et al. . |
| 5,375,068 | 12/1994 | Palmer et al. . |
| 5,384,909 | 1/1995 | Brown . |
| 5,388,197 | 2/1995 | Rayner . |
| 5,394,521 | 2/1995 | Henderson, Jr. et al. . |
| 5,404,393 | 4/1995 | Remillard . |
| 5,410,344 | 4/1995 | Graves et al. . |
| 5,416,508 | 5/1995 | Sakuma et al. . |
| 5,420,975 | 5/1995 | Blades et al. . |
| 5,423,555 | 6/1995 | Kidrin . |
| 5,479,266 | 12/1995 | Young et al. . |
| 5,479,268 | 12/1995 | Young et al. . |
| 5,481,296 | 1/1996 | Cragun et al. ............................ 348/13 |
| 5,517,257 | 5/1996 | Dunn et al. . |
| 5,523,791 | 6/1996 | Berman . |
| 5,532,754 | 7/1996 | Young et al. . |
| 5,550,576 | 8/1996 | Klosterman . |
| 5,561,457 | 10/1996 | Cragun et al. ............................ 348/13 |
| 5,585,858 | 12/1996 | Harper et al. . |
| 5,589,892 | 12/1996 | Knee et al. . |
| 5,619,250 | 4/1997 | McClellan et al. . |
| 5,623,589 | 4/1997 | Needham et al. . |
| 5,629,733 | 5/1997 | Youman et al. . |
| 5,635,978 | 6/1997 | Alten et al. . |
| 5,635,979 | 6/1997 | Kostreski et al. ........................ 348/13 |
| 5,666,293 | 9/1997 | Metz et al. ............................ 395/200.5 |
| 5,666,645 | 9/1997 | Thomas et al. . |
| 5,684,918 | 11/1997 | Abecassis . |
| 5,694,163 | 12/1997 | Harrison . |
| 5,694,334 | 12/1997 | Donahue et al. . |
| 5,701,451 | 12/1997 | Rogers et al. .......................... 707/513 |
| 5,717,914 | 2/1998 | Husick et al. .............................. 707/5 |
| 5,734,720 | 3/1998 | Salganicoff . |
| 5,737,552 | 4/1998 | Lavallee et al. . |
| 5,742,816 | 4/1998 | Barr et al. ................................ 707/104 |
| 5,745,754 | 4/1998 | Lagarde et al. ........................ 707/104 |
| 5,745,909 | 4/1998 | Perlman et al. . |
| 5,748,255 | 5/1998 | Johnson et al. . |
| 5,751,282 | 5/1998 | Girard et al. . . |
| 5,768,539 | 6/1998 | Metz et al. .......................... 395/200.79 |
| 5,790,806 | 8/1998 | Koperda ............................. 395/200.82 |
| 5,818,438 | 10/1998 | Howe et al. . |
| 5,826,166 | 10/1998 | Brooks et al. ........................... 455/5.1 |
| 5,859,662 | 1/1999 | Cragun et al. ............................ 348/13 |

FOREIGN PATENT DOCUMENTS

| | | |
|---|---|---|
| 9531069 | 11/1995 | WIPO . |
| PCT/US96/ 38002 | 11/1996 | WIPO . |
| 9641472 | 12/1996 | WIPO . |
| 9704595 | 2/1997 | WIPO . |
| WO9828907 | 7/1998 | WIPO . |

OTHER PUBLICATIONS

*Personal Television,* by Stewart Brand, The Media Lab: inventing the future at MIT, Viking, 1987, pp. 39–45.

*Prospect for Interactive Video–on–Demand,* by Thomas D.C. Little & Dinesh Venkatesh, IEEE Multimedia, Boston University, Fall 1994, pp. 14–23.

*Automatic Parsing of News Video,* by HongJiang Zhang, Yihong Gong, Stephen W. Smoliar & Shuang Yeo Tan, Institute of Systems Science, National University of Singapore, 1994 IEEE Int. Conf. on Multimedia Computing & Systems, pp. 45–54.

IDIC: *Assembling Video Sequences from Story Plans & Content Annotations,* by Warren Sack & Marc Davis, MIT Media Lab, Machine Understanding Group, 1994 IEEE Int. Conf. on Multimedia Computing & Systems, pp. 30–36.

HyDE: *a hypermedia document editor based on OLE technology,* by J. Sousa Pinto, H.W.J. Borst Pauwels, J. Arnaldo Martins, B. Sousa Santos, Universidade de Aveiro/INESC, Aveiro, Portugal, 1994 IEEE Int. Conf. on Multimedia Computing & Systems, pp. 375–381.

*Interactive Television,* by Donald E. Blahut, Texas E. Nichols, William M. Schell, Guy A. Story, & Edward S. Szurkowski, Proceedings of the IEEE, vol. 83, No. 7, Jul. 1995, pp. 1071–1085.

*Channel–Surfing's Next Wave:* Henry Yuen's interactive TV Guide takes on TCI & Viacom, by Larry Armstrong in Los Angeles, Business Week, Science & Technology, Cable TV, Jul. 31, 1995, pp. 90–91.

*Point–and–Click help for TV types,* by Leonard Wiener, US News & World Report, On Technology, Aug. 21, 1995, p.63.

| ACTIONABLE EVENT RANGE | OVERLAY FUNCTION SET ADDRESSES | INTERFACE DATA ADDRESSES |
|---|---|---|
| 00:08:32:05-00:12:15:32 | X00013256<br>X00013368<br>X00014262<br>X00017350 | X00002426<br>X00002854 |
| 00:35:12:17-00:42:06:27 | X00018462<br>X00018794<br>X00019236 | X00003628 |

FIG. 6   BASIC PROTOCOL
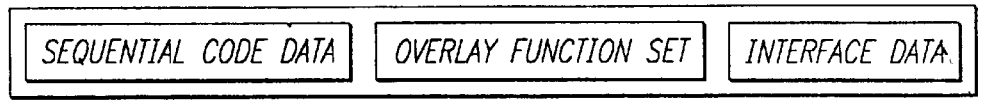
FIG. 6A
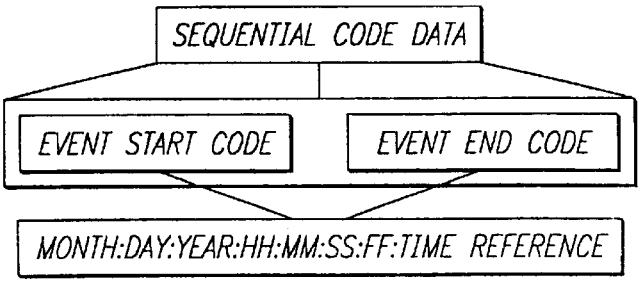
FIG. 6B
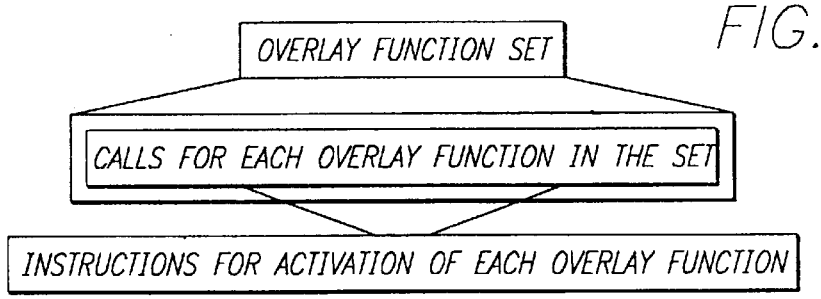
FIG. 6C
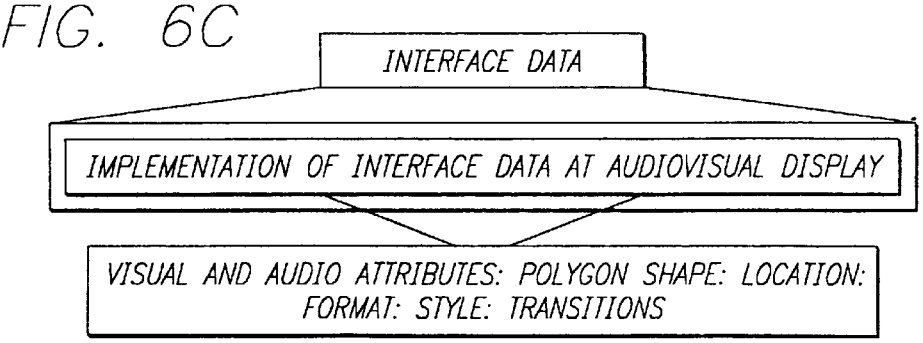

VISUAL OBJECT PRESENT WITHIN LIVE PROGRAMMING AS AN ACTIONABLE EVENT FOR USER SELECTION OF ALTERNATE PROGRAMMING WHEREIN THE ACTIONABLE EVENT IS SELECTED BY HUMAN OPERATOR AT A HEAD END FOR DISTRIBUTED DATA AND PROGRAMMING

BACKGROUND OF THE INVENTION

1. Field of the Invention

The present invention relates to the field of interactive audiovisual systems. More particularly, the present invention relates to a method and apparatus for linking real-time data with audiovisual content to enable a user to make selections, manipulate data, and to execute functions by interacting with the audiovisual content being shown at the time.

2. Art Background

With the development of computer technology, interactive systems are possible that allow users to retrieve data and transact business through various means. Through the telephone, without speaking to a live operator, users can retrieve various types of information, order pay-per-view cable programs, activate credit cards, obtain customer support for products, order movie tickets and listen to and buy musical selections. Using the Internet and commercial online services, users are able to read news reports, view photographs and video clips, listen to sound files, send electronic mail, converse and videoconference in real time with users in remote locations, view sports statistics, buy products, generate maps, and retrieve archived data.

Often a user may decide to use the telephone or an online service to perform such functions based upon programming viewed on television. For example, a user may view a music video on television and then decide to use an automated telephone service or the Internet to order an album by the artist shown. While viewing a football game, a user might be prompted to use the Internet to retrieve statistics for a certain player or team. Users desire to have the ability to perform these functions and new functions using the television instead of having to use a different device such as a computer or telephone.

The advances in digitization and digital compression of data, improvements in transmission media such as fiber optics, and the combination of computer technology with television and audiovisual systems has fostered the development of interactive audiovisual systems. In interactive audiovisual systems, broad bandwidth permits two-way communication, or "interactivity," between the user and a source provider. Such systems allow the user, utilizing a remote control device in conjunction with a set-top box coupled to a cable television, satellite direct broadcast or other communication system, to select a desired movie or program to be viewed, request services and perform other functions such as those that may be performed today using telephones and computer networks. Such systems generally require the user to access such functions by using channels separate from channels on which programming is shown and/or by using menus to access such functions. Often a cursor system is used to allow the user to perform functions using a remote control.

While such systems enable selection of programs and other functions through the television, the selection is not enabled as a function of the content appearing on the television screen. The user must enter a certain mode or otherwise enable a function which is always available to the user upon request. The present invention provides a method for enabling functions only at specified times based upon the content of audiovisual programming being shown to the user at the time. Furthermore, the functions enabled can be made to depend upon the content of the present audiovisual programming, so that the functions can be tailored to specific moments or events in an audiovisual presentation. The present invention presents the user with the ability to interact with the programming by selecting items appearing in the programming shown on the screen with a cursor, by making selections when prompted verbally by an on-screen host, or by other means. It will be understood by those skilled in the art that the present invention may be used for a variety of purposes, some of which are described in detail herein.

SUMMARY OF THE INVENTION

The present invention provides a method and apparatus for enabling a user of an interactive audiovisual system to perform functions in real time based upon the content of audiovisual programming being shown to the user at the time ("overlay functions").

The present invention provides a method and apparatus for linking real-time data with audiovisual content to enable a user to make selections, manipulate data, and to execute functions interactively through an audiovisual display unit based upon audiovisual content being displayed at the current time. Put another way, audiovisual content is presented in synchronization with selected overlay functions so that the user has the ability to interact with the audiovisual content by performing said overlay functions associated with selected events that occur in the programming ("actionable events").

A method and apparatus are provided to make overlay functions available to the user through the audiovisual display during the actionable events that occur in programming being viewed by the user. A user interface for each overlay function that may be performed, which user interface may or may not be visible to the user, is overlaid on and synchronized with the programming being shown. Interaction with selections may be made using any of several known methods such as a screen menu or a cursor controlled by a remote control device. For example, while viewing a movie starring a famous celebrity, the set of overlay functions may include the ability to retrieve in an overlay window a list of recent movies starring the celebrity by selecting the celebrity's name during the opening credits of the movie, or whenever the celebrity appears on the audiovisual display. In some instances, a visible cue may exist to indicate that a function may be performed, such as a visible graphical outline appearing on the audiovisual display around an item that may be selected. As another example, during a football program, a user may be able to retrieve a team roster by selecting the name of a team when shown, or the career statistics of a player by selecting that player. As another example, while viewing a television program which reviews current movies, a user would have the ability to access an Internet World Wide Web site for a given movie by making a selection while that movie is being reviewed. As another example, the present invention may be used to implement an audiovisual program guide that allows a user to select programming being shown at the time by giving the user the ability to select one of several areas on the user's television screen, with each of the several areas displaying a different program that is available to the user at the time.

In the present invention, a set of overlay functions ("overlay function set") is associated with each program to be shown to users. The overlay functions could include a variety of retrievable information and interactive functions that will be available to the user while the user is viewing the program. Each program may have unique overlay function sets since the overlay functions made available are based upon the unique content of each program. For each actionable event in a program, the operator will determine the overlay function set that will be made available to the user, and the characteristics of the interface that will both present the availability of the overlay functions to the user and allow the user to access the overlay functions. Overlay function sets and interface data for a plurality of programs are stored in memory. When a program having overlay function sets and interface data associated with it is sent by the source provider to a user (whether requested on demand, shown at a pre-determined time, or otherwise), the overlay function sets and interface data for the program, which may also be sent by the source provider, are synchronized with the program and loaded into the set-top box. The processor in the set-top box reads the overlay function set and interface data and then both implements the interface and enables the overlay functions in real time and in synchronization with the associated actionable event in the programming. As the user interacts with the program through the synchronized interface, the set-top box implements the relevant overlay functions selected by the user. Alternatively, the set-top box may communicate with the source provider as necessary to implement certain overlay functions selected by the user.

BRIEF DESCRIPTION OF THE DRAWINGS

FIG. 6 illustrates the basic protocol fields that facilitate the synchronization of overlay function sets and interface data with actionable events.

DETAILED DESCRIPTION OF THE INVENTION

1. General Considerations

Figure 1:
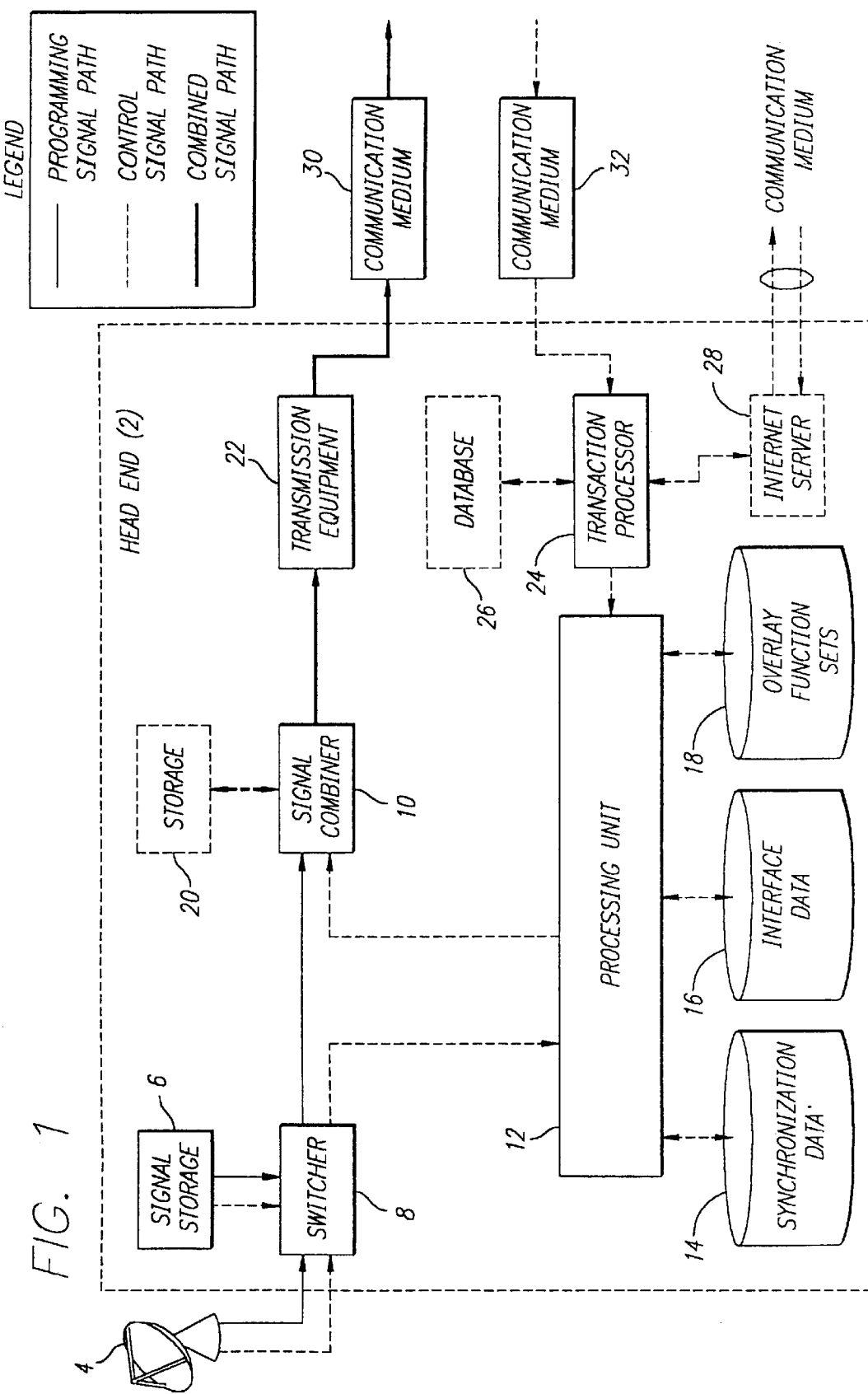
FIG. 1 is a functional block diagram of a head end of an interactive television system utilizing the teachings of the present invention.

In the present case, the operations described herein are machine operations performed automatically or in conjunction with a human operator. Useful machines for performing the operations of the present inventions include general purpose digital computers, digitally controlled displays, or other similar devices such as set-top box control systems, video on demand servers and the like. The present invention relates to method steps for operating an interactive audiovisual system and processing electrical or other physical signals to generate other desired physical signals.

The present invention also relates to an apparatus for performing these operations. This apparatus may be specially constructed for the required purposes or it may comprise general purpose computers selectively activated or reconfigured by computer programs stored in the computers. The method steps presented herein are not inherently related to any particular computer or other apparatus. In particular, various general purpose machines may be used with programs in accordance with the teachings herein, or it may prove more convenient to construct more specialized apparatuses to perform the required steps.

Additionally, no particular programming language has been indicated for carrying out the various methods described herein. Each designer of a particular computer, interactive multimedia system, or other display apparatus will be aware of a language which is most suitable for his or her immediate purposes. Because the computers, servers, processing units, set-top boxes and other devices which may be used in practicing the present invention consist of many diverse elements, no detailed program listing has been provided. It is considered that the operations and other procedures described herein and illustrated in the accompanying drawings are sufficiently disclosed to enable one of ordinary skill to practice the present invention.

In a typical interactive audiovisual system, a head-end is coupled to a wire or wireless, analog or digital, communication medium such as cable, satellite, microwave, terrestrial wave or optical fiber, which is in turn coupled to a plurality of users. At the location of each user, a set-top box is coupled to the communication medium for receiving programming and data from the head end. In some systems it may be necessary for the set-top box to send data back to the head end via the same communication medium or a different communication medium. For example, a satellite signal could be used to transmit programming and data from the head end to the set-top box, while a wire telephony system may be used to send data from the set-top box back to the head end. The set-top box is also coupled to a television or other audiovisual display unit to enable the presentation of programming and data sent from the head end. The set-top box may include a processing unit coupled to a memory and other electronic modules such as decoders, decompressors and audiovisual generators. Computer programming and data files are stored within the memory and accessible by the processing unit. The processing unit generates and displays a graphical user interface on the user's audiovisual display unit, and controls any interactive communication between the user and the head end. Typically the user's system will include a user input device, such as a remote control device, for use in conjunction with the set-top box to enable the user to make selections, change channels and settings, and perform other functions.

2. General System Configuration

Figure 2:
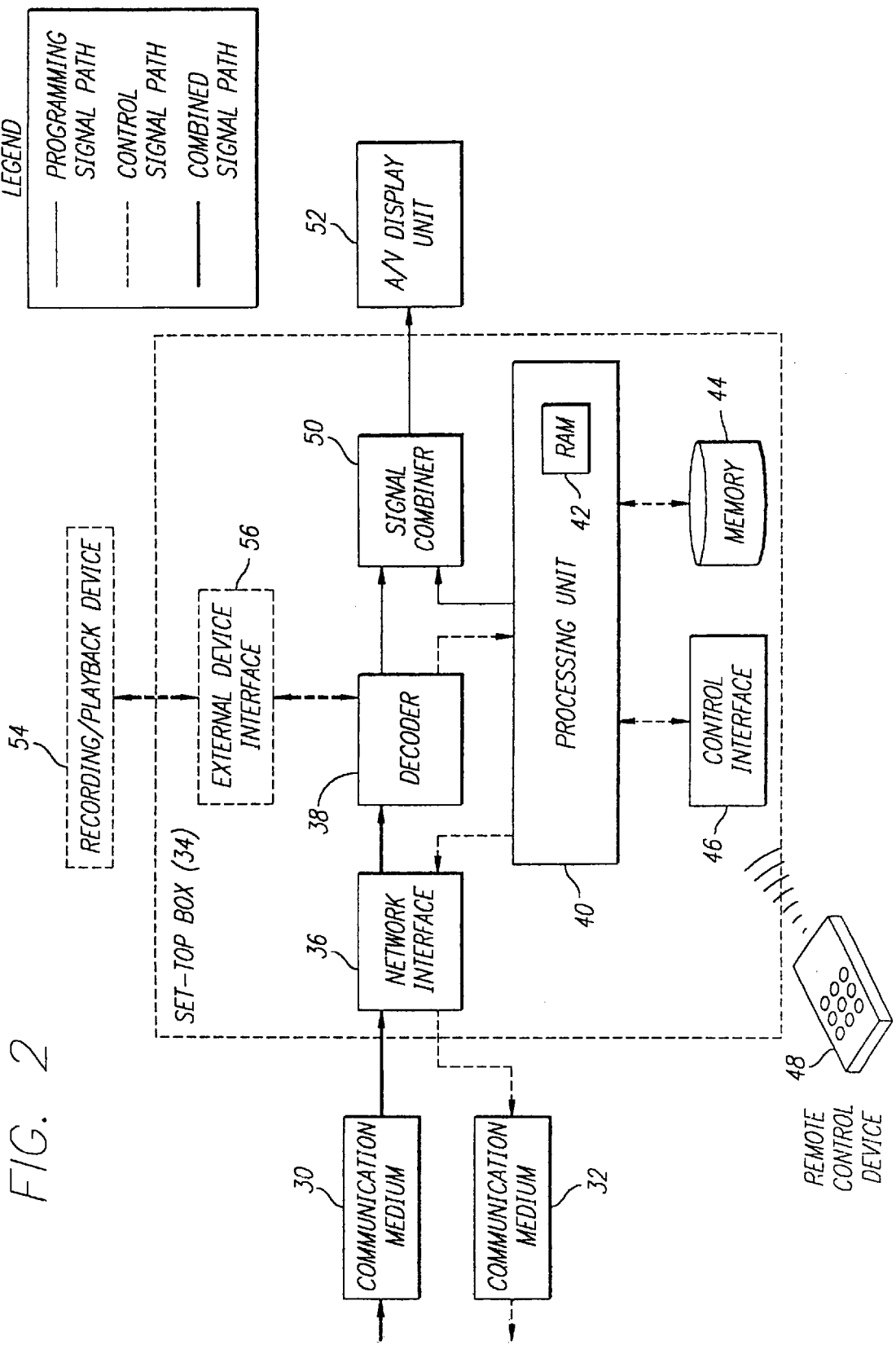
FIG. 2 is a functional block diagram of a remote user location of an interactive audiovisual system utilizing the teachings of the present invention.

One embodiment of the present invention may be described with reference to FIGS. 1 and 2. FIG. 1 is a functional block diagram of a head end of an interactive television system utilizing the teachings of the present invention. FIG. 2 is a functional block diagram of a remote user location of an interactive audiovisual system utilizing the teachings of the present invention. In operation, as one of the first tasks in implementing this embodiment of the present invention, the entire length of each program with which users will be able to interact is indexed with sequential code data, which sequential code data may correspond to the elapsed time of each said program during its presentation. For example, the SMPTE time code and the Sony RC time code are well-known in the art as forms of sequential code data. Once the program has been sequentially coded, any actionable event in a program can be uniquely identified by the beginning and ending sequential codes during which the event occurs. It is to be noted that data other than time may be used to index the program sequentially, such as, for example, the number of digital bytes read, the number of film frames elapsed, or some other non-time-based means for counting.

As a next step in implementing the system illustrated in FIG. 1, the program may be viewed by a human operator, before the program is to be transmitted to users, so that the operator may determine and record the sequential codes for the actionable events. For example, in a certain program it may be determined that "silver spaceship appears at sequential codes 1:13:43 through 1:14:17" or, in a hosted program guide, that the "on-screen host discusses Westerns at sequential codes 2:42:02 through 2:48:25." At this point there exists a set of data containing unique indicators for each actionable event in the programming in the form of sequential code data associated with each of those actionable events.

After the actionable events in a given program have been identified using the associated sequential code data, the overlay functions that will be made available to the user and the interface through which the availability of the overlay functions will be presented to the user and through which the user will access the overlay functions, can be created for the program. Instructions to be used by the set-top box to allow the user to select overlay functions will be included as part of the interface data. As one example of the implementation of interface data, user input can be determined by defining a screen area of the user's audiovisual display unit which may be actively selected by a user, and implementing the corresponding overlay function if the user selects the defined screen area using a cursor or some other means for indicating the selection of a certain screen area. For example, the two-dimensional (X, Y) screen coordinates defining a selectable area of the screen may be sent to the set-top box as part of the interface data. Alternatively, the interface data defining a selectable screen area might include the two-dimensional coordinates of a single point on the screen and the radius of a circle centered at the single point. The set-top box may be programmed to generate the areas defined by the interface data. In addition to defining the selectable screen areas, the interface data may also include visual indicators, or overlays, which will appear over the program shown to the viewer during the actionable event to indicate where the selectable screen areas are located. For example, a certain object appearing on the screen may be highlighted in a certain transparent color to indicate to the user that the object may be selected with a cursor to perform an overlay function while the object is highlighted. As another example, the interface data may include a graphical, animated or live-action icon that will appear at a certain area on the screen while the actionable event is occurring. In this example, the location of the icon would coincide with a selectable screen area so that the user may implement an associated overlay function by selecting the icon. As another example, the interface data may be used to implement an audiovisual program guide that allows a user to select programming being shown at the time. The user's screen may separated into two or more screen areas, with each of the areas displaying a different program, or an icon or other representation of a different program, that is available to the user at the time. As described above, the interface data may include the two-dimensional (X,Y) coordinates of each screen area, as well as a visual indicator, or overlay, which will appear over the selectable screen area coinciding with the position of the user's cursor at the time. When the user moves the cursor to another selectable screen area, the visual indicator would appear over the new selectable screen area, which may then be selected by the user with the cursor to access the programming represented in that selectable screen area.

As another example of the implementation of interface data, the user might perform a function by pressing a special button on a remote control device when a text message generated by the set-top box appears at the bottom of the screen. In such a case, the interface data could include the text message to be displayed, or the interface data may include instructions to the set-top box to generate the text message.

It is to be understood that the interface need not include a graphical overlay to indicate an actionable event. Users may be prompted by other means to perform overlay functions during actionable events. For example, a program may include a speaking host (who may or may not appear on screen) that tells the user which overlay functions may be performed at the time as well as how the user may perform the functions. Alternatively, the interface data may include audio data which is to be heard by the user when overlay functions are enabled.

After the operator has created the interface data and overlay function set that will be made available to the user for a given actionable event, it will be necessary to uniquely associate the interface data and overlay function set with the related actionable event. The interface data and overlay function set for a given actionable event may be uniquely associated with the actionable event by using the same sequential code data to identify the actionable event, the related overlay function set and the related interface data. This may be accomplished by assigning the sequential code data for the actionable event to the related interface data and overlay function set. By assigning sequential code data to the interface data and overlay function set that matches the sequential code data of the related actionable event, the interface data and overlay function set can be retrieved from memory at the proper time and synchronized with the related actionable event by comparing the sequential code data assigned to the interface data and overlay function set with the current sequential code data during the presentation of the program to the user. Accordingly, it is understood that for each sequentially coded program, synchronization data is created by a human operator, which data contains the sequential code data for the actionable events in the programming and the location in memory of interface data and overlay function set to be retrieved and presented to the user when the sequential code data for each actionable event is encountered. Those skilled in the art will understand that the synchronization data may take the form of a look-up table.

Figures 3, 4:
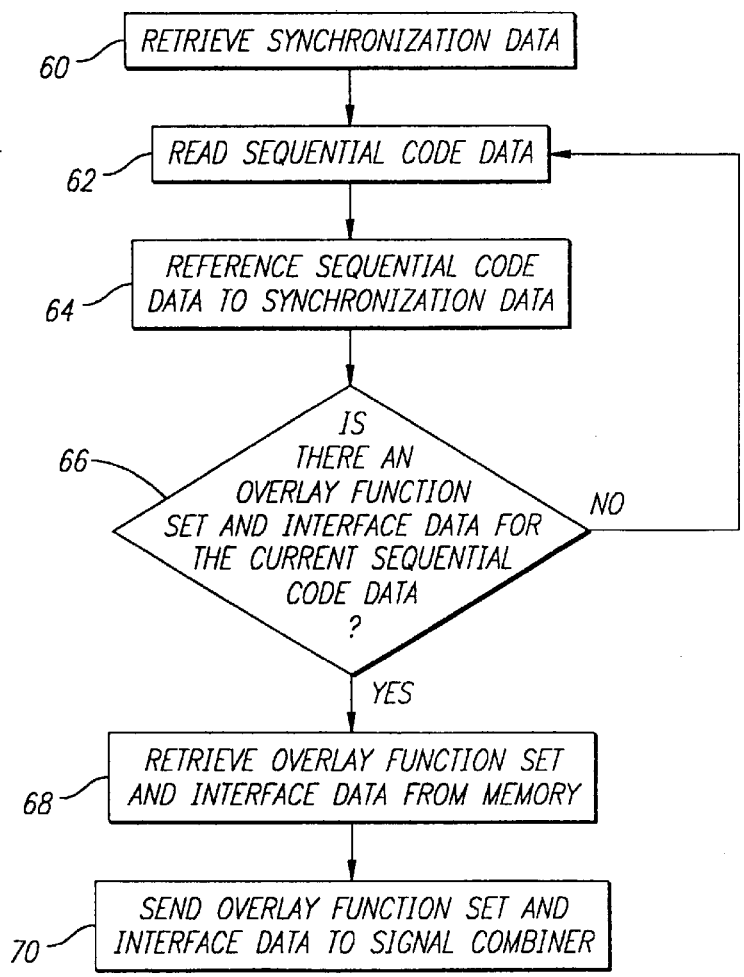
FIG. 3 shows one possible implementation of synchronization data.
FIG. 4 is a flowchart of the detailed process performed by the processing unit in the head end of an interactive audiovisual system in one embodiment of the present invention.

FIG. 3 shows one way in which synchronization data to be accessed by the processing unit (12) may be structured. In FIG. 3, the synchronization data is depicted as a table of addresses of the calls for the overlay function set and interface data associated with each actionable event in a program. It should be understood that additional attributes may be included in the synchronization data shown in FIG. 3, such as a subset of user set-top box addresses for which a given actionable event will or will not be actionable. For example, if a certain group of users are not authorized to select overlay functions for a given event, the synchronization data may contain the set-top box addresses for those unauthorized users so that the processing unit can be instructed not to send the overlay function set and interface data for the actionable event to the unauthorized users.

Referring now to head end (2) shown in FIG. 1, the first embodiment of the present invention uses sequentially coded programming received at the head end (2) by various means including transmission via satellite (4) from a remote location, or such sequentially coded programming may be stored in signal storage (6) at the head end. It is to be understood that sequentially coded programming may be stored in a variety of formats, including but not limited to MPEG format, DVD, videotape, or other formats. A switcher (8) is provided which switches between the programming sources depending upon which is desired to be transmitted to the user. It is understood by those skilled in the art that the switcher may take many forms. The switcher transmits the sequentially coded program to a signal combiner (10). It is understood that the signal combiner is well-known in the art and may be a multiplexer, a line inserter or other component.

The sequentially coded program is also transmitted to a processing unit (12), which may include components such as random access memory, processors, coprocessors, and interface drivers. FIG. 4 illustrates the detailed process performed by the processing unit (12) in the present embodiment. At block (60), the processing unit (12) retrieves the synchronization data for the program from memory (14). The synchronization data is predetermined and may be stored in memory (14) by a human operator or downloaded to memory automatically from the source of the sequentially coded program with which the synchronization data is associated, prior to the transmission of the program. At block (62), the processing unit (12) reads the sequential code data associated with the sequentially coded program. At block (64), the processing unit (12) references the sequential code data to the synchronization data. At block (66), the processing unit (12) determines whether an overlay function set and interface data exist for the current sequential code data (i.e., whether there is an actionable event occurring in the programming). At block (68), if an overlay function set and interface data exist for the sequential code data read by the processing unit (12), the processing unit (12) retrieves the interface data from memory (16) and the overlay function set from memory (18). If an overlay function set and interface data do not exist for the sequential code data being read, the processing unit prepares itself to read the next sequential code data. The overlay function set and interface data is predetermined and may be stored in memories (16 and 18) by a human operator or downloaded to memory automatically from the source of the sequentially coded program with which the synchronization data is associated, prior to the transmission of the program. At block (70), after retrieving the interface data and the overlay function set from memory, the processing unit (12) sends the overlay function set and interface data to the signal combiner (10), which combines the overlay function set and interface data with the sequentially coded program so that the combined signal output by the signal combiner (10) contains the interface data and the overlay function set synchronized with the actionable event identified by the sequential code data read by the processing unit (12). The signal combiner (10) sends the combined signal to the head end transmission equipment (22) for transmission to one or more remote user locations (as shown in FIG. 2) via communication medium (30). It is understood that head end transmission equipment may take various forms and is well-known in the art. It should further be understood that, in this embodiment, the synchronization of the interface data and the overlay function set with the associated actionable event occurs in the head end (2). Alternatively, such synchronization may occur at a remote location from which the synchronized interface data, overlay function set and program may be transmitted to the head end (2) or a plurality of head ends for ultimate transmission to users as further described herein.

It is to be understood that a number of unique protocols may be designed to implement the synchronization of overlay function sets and interface data with actionable events as disclosed in the present invention. FIGS. 6, 6a, 6b and 6c illustrate basic protocol fields, to be employed in a transport layer, that may be used to facilitate the synchronization process. The signal combiner structures the combined signal as shown in FIG. 6. The sequential code data for a given actionable event may be sent first, followed by the overlay function set for the actionable event, followed by the interface data for the actionable event. As shown in FIG. 6a, the sequential code data for the actionable event may consist of the start and end codes for the actionable event. As shown in FIG. 6b, the overlay function set may consist of the calls to be made by processing units to implement each available overlay function. As shown in FIG. 6c, the interface data may consists of screen indicator attributes such as polygon shape, location, format, style and transitions.

Figure 5:
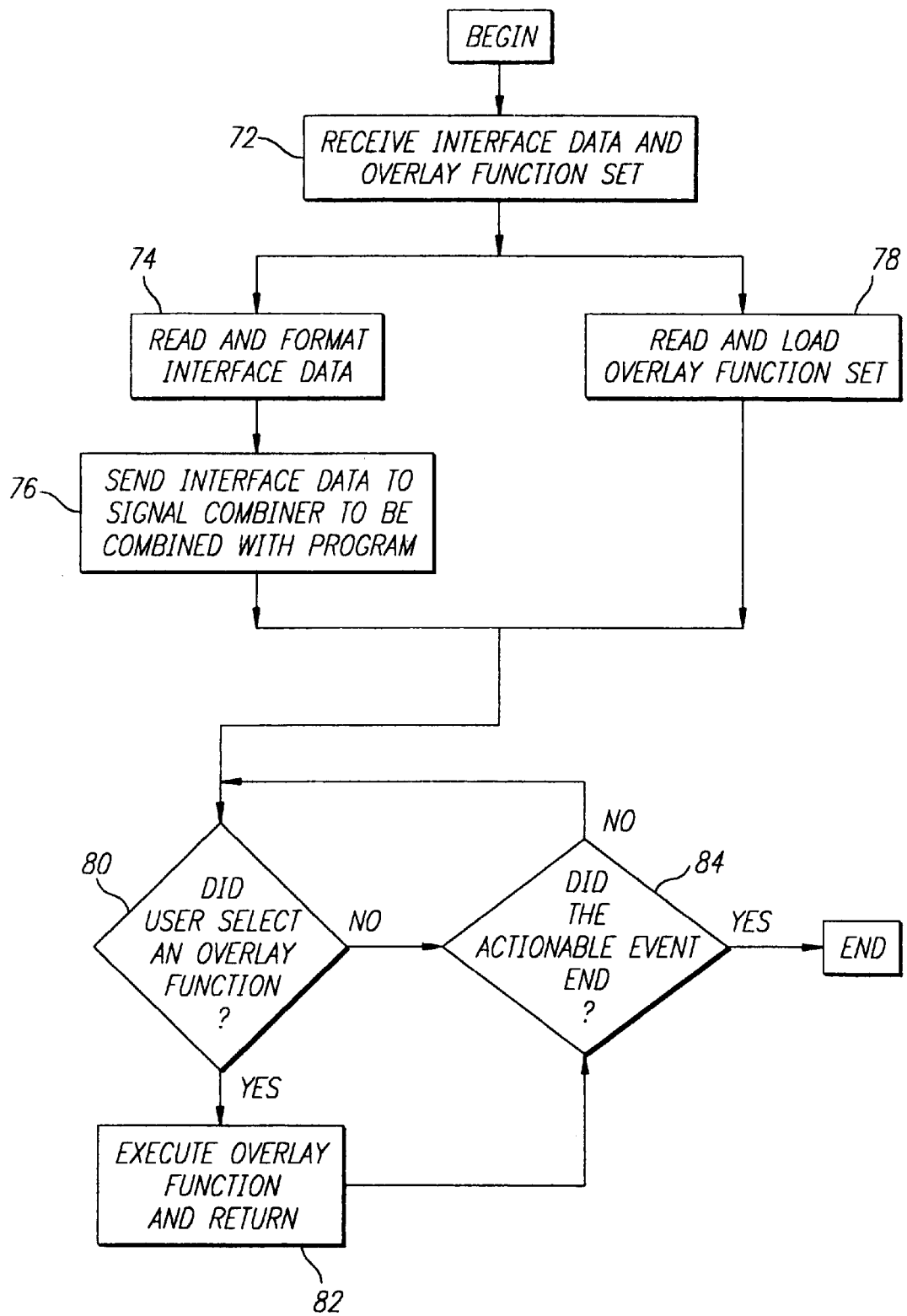
FIG. 5 is a flowchart of the detailed process performed by the processing unit in the set-top box in one embodiment of the present invention.

The apparatus of the remote user location is shown in detail in FIG. 2. The combined signal containing the program, overlay function set and interface data is received at a receiving unit, which may be a set-top box (34) as shown in FIG. 2, by a network interface (36) which sends the combined signal to a decoder (38) which separates the program from the overlay function set and interface data sent from the head end (2). The decoder sends the program to a signal combiner (50) which sends the program to the audiovisual display unit (52) for presentation to the user. Simultaneously, the decoder sends the synchronized interface data and overlay function set to a processing unit (40). FIG. 5 illustrates the detailed process performed by the processing unit (40) in the present embodiment. At block (72), the processing unit (40) receives the interface data and overlay function set. At block (74), the precessing unit (40) reads and formats the interface data. At block (76), the processing unit (40) implements the user interface in accordance with the instructions contained within the interface data, including sending visual, audible, textual, and other material to the signal combiner (50) for presentation to the user in synchronization with the actionable event being sent to the audiovisual display unit (52). At block (78), the processing unit (40) simultaneously reads the overlay function set and enables overlay functions in synchronization with the actionable event being sent to the audiovisual display unit (52) so that the user is able to implement the various overlay functions. The user may implement those functions by making selections using a remote control device (48) which transmits input signals to a control interface (46) coupled to the processing unit (40). At block (80), the processing unit (40) determines whether the user has selected an overlay function. At block (82), if the user has selected an overlay function, the processing unit (40) causes the selected overlay function to be performed. One or more of the overlay functions selected by the user may be performed in the set-top box (34) by the processing unit (40), which may include components such as interface drivers, processors, and co-processors and may include random access memory (42) capable of running applications that may be accessible as part of the overlay functions available to the user. Such applications may be pre-loaded in the set-top box or downloaded from the head end as needed. Alternatively, one or more of the overlay functions selected by the user may be performed at the head end (2) or other remote location. Signals received from the user at the control interface (46) by the processing unit (40) may be sent through the network interface (36) via communication medium (32) to a transaction processor (24) located at the head end (2), which causes the implementation of the overlay functions. It should be understood at this point that communication medium (32) and communication medium (30) may be the same medium or they me be different. For example, communication medium (30) may be a satellite signal, while communication medium (32) may be electrical wire, or alternatively, a two-way optical fiber may be used as the sole communication medium between the head end (2) and a plurality of remote user locations. The transaction processor may be coupled to Internet servers (28), databases (26), computer networks and other components to facilitate the implementation of the various overlay functions selected by users. For example, if an overlay function allows the user to connect to a world-wide web site containing information related to an actionable event in the programming being presented, the transaction processor may be connected to an Internet server to allow the user to access the world-wide web site. As another example, if an overlay function allows the user to request to be reminded when a future program is about to begin, the transaction processor may be connected to a computer system set up to store unique user addresses and program reminder information to be sent to such addresses. At block (84), if the user did not select an overlay function, the processing unit (40) determines whether the current actionable event has ended. If the actionable event has not ended, the processing unit (40) continues to determine whether the user has selected an overlay function. If the actionable event has ended, the processing unit (40) resets and awaits the next actionable event.

In a second embodiment of the present invention, the synchronization of the interface data and the overlay function set with the associated actionable event occurs in the set-top box (34) instead of in the head end (2). In such an embodiment, referring again to FIG. 1, the processing unit (12) may determine from data received prior to receiving the sequentially coded program whether overlay function sets and interface data are available for the program (i.e., whether there are one or more actionable events occurring in the programming). If overlay function sets and interface data are available, the processing unit (12) retrieves them from memory (16 and 18) and sends them to the set-top box (34) at some time prior to the transmission of the program to the set-top box (34). The processing unit (12) also retrieves synchronization data from memory (14) which, as further described below, will allow the set-top box (34) to synchronize overlay function sets and interface data with actionable events based upon sequential code data. It is to be understood that the synchronization data, overlay function sets and interface data may be stored with the associated program (in signal storage (6) or in storage at the location from which satellite transmitted programs are transmitted) and transmitted immediately prior to the transmission of the program to the switcher (8) and subsequently to the processing unit (12) and on to the set-top box (34).

The synchronization data, overlay function set and interface data, and the sequentially coded program, are received at the set-top box (34) by network interface (36) coupled to decoder (38). The decoder (38) sends the synchronization data, interface data and overlay function data to a processing unit (40) which stores them in memory (44). The processing unit (40) performs the same process detailed in FIG. 4 as described with respect to the first embodiment, whereby the processing unit (40) is programmed to read the sequential code data associated with the program and reference it to the synchronization data stored in memory (44) to determine whether overlay function sets and interface data exist for the sequential code data read by the processing unit (40) (i.e., whether there are actionable events occurring in the programming). If overlay function sets and interface data exist for the sequential code data read by the processing unit (40), the processing unit retrieves the overlay function sets and interface data from memory (44). The processing unit (40) reads the interface data and implements the user interface in accordance with the instructions contained within the interface data, including sending visual, audible, textual, and other material to the signal combiner (50) for presentation to the user in synchronization with the actionable event being sent to the audiovisual display unit (52). The processing unit (40) also reads the overlay function set and enables overlay functions in synchronization with the actionable event being sent to the audiovisual display unit (52) so that the user is able to implement the various overlay functions.

In a third embodiment of the present invention, it should be appreciated that a program and related interface data and overlay function sets may be stored in transportable media such that actionable events in the programming are synchronized with associated interface data and overlay function sets prior to presentation to a user. In such an embodiment, the synchronization process described in the first embodiment and shown in FIG. 1 as occurring in the head end (2) may be performed as described, except that the combined signal which is output by the signal combiner (10) may be stored in storage (20) for later transmission from the head end (2) as already described for the first embodiment, or for transfer to copies of transportable media, such as videotape, compact disc, DVD or other formats. Alternatively, the combined signal which is output by the signal combiner (10) may be transmitted to the remote user location, as described in the first embodiment, and then stored in transportable media by an appropriate recording/playback device (54) coupled to decoder (38) through external device interface (56). As shown in FIG. 2, during playback from transportable media by recording/playback device (54), the combined signal is transmitted through external device interface (56) to decoder (38) and is processed as described in the first embodiment presented herein. Although the transmission of the program would originate in the user's home or other remote location from the recording/playback device (54), it would still be possible for one or more of the overlay functions selected by the user to be performed at the head end (2) or other remote location instead of in the set-top box (34). Signals received from the user at the control interface (46) by the processing unit may be sent through the network interface (36) via communication medium (32) to a transaction processor (24) located at the head end (2) or other remote location, which would implement the overlay functions.

In yet another embodiment of the present invention, actionable events for a program may be selected, and interface data and overlay function sets may be created or selected for those actionable events and made available to users, during the transmission of the program. In this embodiment, a human operator using a general purpose computer located at a head end location (2) may select overlay functions and create an interface, or select a preexisting interface, for a given event that the operator wishes to make actionable for users. After selecting the overlay functions and the interface for the current event which the operator wishes to make actionable, the operator instructs the processing unit (12) in the head end to immediately send the overlay function set and interface data to the signal combiner (10) to be synchronized with the event being transmitted to users at the time. In this embodiment, it is not necessary for the program to be sequentially coded in advance of transmission since the operator determines when the overlay function sets and interface data should be sent to users. Upon receipt at the set-top box (34), the program, the interface data and the overlay function sets are handled in the same fashion as the first embodiment described herein, whereby the overlay function sets and interface data are processed by the processing unit (40) and presented to users immediately.

There has been described novel methods and apparatus for linking real-time data with audiovisual content to enable a user to make selections, manipulate data, and to execute functions by interacting with the audiovisual content being shown at the time. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and methods herein disclosed and limited solely by the spirit and scope of the appended claims.

We claim:

1. A method of distributing audiovisual programming, comprising the steps of:

displaying live programming to a human operator located at the head end of a distribution system while distributing for display the live programming at substantially the same time to a plurality of remotely located users;

automatically detecting one of a plurality of pre-selected visual objects present within the live programming as an actionable event, during which a user selection may be accepted;

adding data for distribution with the live programming in response to the detection of the visual object and in response to an operator selection of another actionable event made by the human operator;

adding synchronization data for distribution with the live programming, delineating a time period within the live programming display during which a user selection may be accepted;

adding overlay function data for distribution with the live programming, controlling the distribution of alternate programming to be displayed in response to an individual user making a user selection in response to the actionable event;

adding interface data for distribution with the live programming, providing indication to each of the plurality of users of the opportunity to make a user selection;

recognizing a user selection by one of the plurality of users of the opportunity to make a user selection;

distributing the user selected alternate programming for display to the user.

2. The method of claim 1, wherein the step of adding data further comprises the step of:

adding interface data for visually indicating to the user the opportunity to make a user selection.

3. The method of claim 1, wherein the step of adding data further comprises the step of:

adding interface data for visually indicating with an animated icon the opportunity to make a user selection.

4. The method of claim 1, wherein the step of adding data further comprises the step of:

adding interface data for indicating to the user with audio prompting the opportunity to make a user selection.

5. The method of claim 1, wherein the step of adding data further comprises the step of:

adding interface data for visually indicating with two or more selectable screen areas the opportunity to make a user selection.

6. The method of claim 1, wherein the step of adding data further comprises the step of:

adding data for visually distinguishing the automatically detected visual object in the live programming being displayed to the plurality of users.

7. The method of claim 1, wherein the step of distributing alternate programming is performed without storing information indicating which programming said user was viewing prior to making said user selection.

8. The method of claim 1, further comprising the steps of:

displaying said alternate programming to a second human operator;

adding second data to said alternate programming in response to a second operator selection of a second actionable event;

recognizing a second user selection made by said user in response to the second actionable event; and distributing second alternate programming for display to said user.

9. A system for distributing audiovisual programming, comprising:

a signal source providing live programming, displayed to a human operator located at the head end of a distribution system while distributed at substantially the same time to a plurality of remotely located users;

a processing unit located at the head end, coupled to the signal source, which is programmed to:
  i) detect one of a plurality of pre-selected visual objects present within the live programming as an actionable event, during which a user selection may be accepted; and
  ii) add data for distribution with the live programming in response to the detection of the visual object and in response to an operator selection of another actionable event made by the human operator, the added data including
    a) synchronization data delineating a time period within the live programming display during which a user selection may be accepted,
    b) overlay function data controlling the distribution of alternate programming to be displayed in response to an individual user making a user selection in response to the actionable event, and
    c) interface data providing indication to each of the plurality of users of the opportunity to make a user selection;

transmission equipment distributing the live programming for display to the plurality of users;

a set-top box recognizing a user selection in response to the selected actionable event; and a transaction processor distributing the alternate programming to the user in response to the user selection.

* * * * *

UNITED STATES PATENT AND TRADEMARK OFFICE
CERTIFICATE OF CORRECTION

PATENT NO   : 5,931,908
DATED       : August 3, 1999
INVENTOR(S) : Gerba et al.

It is certified that error appears in the above-identified patent and that said Letters Patent is hereby corrected as shown below:

Col. 8, line 32, "precessing" should read - -processing- -.

Column 11, Claim 1, line 50, delete "of the opportunity to make a user selection" and insert thereof - -in response to the actionable event; and- -.

Signed and Sealed this

Second Day of May, 2000

Attest:

Attesting Officer

Q. TODD DICKINSON
Director of Patents and Trademarks